United States Patent [19]

Brunelle

[11] Patent Number: 4,590,257

[45] Date of Patent: May 20, 1986

[54] BORON- AND NITROGEN-CONTAINING COMPOSITIONS AND THEIR USE IN POLYCARBONATE AND POLYESTER-POLYCARBONATE SYNTHESIS

[75] Inventor: Daniel J. Brunelle, Scotia, N.Y.

[73] Assignee: General Electric Company, Schenectady, N.Y.

[21] Appl. No.: 510,500

[22] Filed: Jul. 5, 1983

[51] Int. Cl.$^4$ .................... C08G 63/62; C08G 63/64
[52] U.S. Cl. .................... 528/176; 528/179; 528/180; 528/181; 528/182; 528/196; 528/198; 528/200
[58] Field of Search ............... 528/176, 179, 180, 181, 528/182, 196, 198, 199, 200; 564/8, 9

[56] References Cited

U.S. PATENT DOCUMENTS

| | | | |
|---|---|---|---|
| 3,153,008 | 10/1964 | Fox | 528/196 |
| 4,330,664 | 5/1982 | Brunelle | 528/198 |
| 4,345,062 | 8/1982 | Brunelle | 528/198 |
| 4,529,529 | 7/1985 | Horodysky | 564/9 |

OTHER PUBLICATIONS

Morrison et al., *Organic Chemistry*, Third Edition, pp. 342, 360, 361 (Boston: Allyn & Bacon, Inc., 1973).

*Primary Examiner*—Lester L. Lee
*Attorney, Agent, or Firm*—William H. Pittman; James C. Davis, Jr.; James Magee, Jr.

[57] ABSTRACT

Boron- and nitrogen-containing compositions prepared by the reaction of a quaternary ammonium hydroxide with a trialkyl or triaryl borate are useful for the preparation of the active catalyst species in the transesterification of reaction for the production of polycarbonates or polyester-polycarbonates from diaryl carbonates (optionally in admixture with diaryl dicarboxylates) and dihydroxyaromatic compounds.

28 Claims, No Drawings

BORON- AND NITROGEN-CONTAINING COMPOSITIONS AND THEIR USE IN POLYCARBONATE AND POLYESTER-POLYCARBONATE SYNTHESIS

This invention relates to the preparation of aromatic condensation polymers by transesterification and to catalyst compositions for use therein.

The preparation of polycarbonates and polyesterpolycarbonates by transesterification of diaryl carbonates (optionally in admixture with diaryl dicarboxylates) with dihydroxyaromatic compounds is known. Generally, this transesterification reaction requires a catalyst. Suitable catalysts include those disclosed in U.S. Pat. No. 4,330,664, especially tetraalkylammonium borohydrides. As disclosed in U.S. Pat. No. 4,345,062, such borohydrides may be reacted with phenols or diaryl carbonates to preform an active catalyst species. The disclosures of both of the aforementioned patents are incorporated herein by reference.

The tetraalkylammonium borohydrides are particularly advantageous for use in the transesterification reaction since, in addition to catalyzing said reaction, their presence in the polymer tends to retard heat-induced degradation. However, such compounds tend to be pyrophoric. Moreover, they are relatively expensive. It is of interest, therefore, to provide transesterification catalyst compositions which have the advantages but not the disadvantages of the tetraalkylammonium borohydrides.

A principal object of the present invention, therefore, is to provide a method for preparing boron- and nitrogen-containing compositions used as transesterification catalysts for polycarbonate and polyester-polycarbonate formation.

A further object is to provide improved boron- and nitrogen-containing catalyst compositions.

A still further object is to provide an improved method for producing polycarbonates and polyester-polycarbonates.

Other objects will in part be obvious and will in part appear hereinafter.

In one of its aspects, the present invention is directed to a method for preparing a boron- and nitrogencontaining composition which comprises preparing a mixture comprising (A) at least one quaternary ammonium hydroxide having the formula $$(R^1)_4 NOH, \qquad (I)$$

wherein each $R^1$ is independently an alkyl radical containing about 1–4 carbon atoms or an aryl or aralkyl radical containing about 6–10 carbon atoms; and (B) at least one borate having the formula $$(R^2O)_3B, \qquad (II)$$

wherein each $R^2$ is independently a lower alkyl radical or a radical of the formula $X_n\text{-}Ar^1$, $Ar^1$ is an aromatic hydrocarbon radical containing about 6–10 carbon atoms, each X is independently an electron-withdrawing substituent and n is a number from 0 to the number of aromatic carbon atoms in $Ar^1$ which are capable of substitution.

Reagent A in the catalyst preparation method of this invention is at least one quaternary ammonium hydroxide having formula I. In that formula, each $R^1$ value may be an alkyl radical containing about 1–4 carbon atoms (e.g., methyl, ethyl, n-propyl, isopropyl, n-butyl) or an aryl or aralkyl radical containing about 6–10 carbon atoms (e.g., phenyl, benzyl). Most often, all $R^1$ values are the same and are alkyl, particularly methyl or ethyl and preferably methyl. Thus, reagent A is most preferably tetramethylammonium hydroxide.

Reagent B is at least one borate having formula II; it may be an alkyl, aryl or mixed alkyl-aryl borate. Any or all of the $R^2$ values therein may independently be lower alkyl radicals, i.e., alkyl radicals containing up to 7 carbon atoms. Preferably, they contain 1–4 carbon atoms. Illustrative alkyl radicals are methyl, ethyl, butyl, hexyl and heptyl, with all isomers being included but the normal isomers being preferred.

Any or all of the $R^2$ values may also be aromatic hydrocarbon radicals (identified hereinabove as $Ar^1$) such as phenyl, tolyl, xylyl or naphthyl. Said $Ar^1$ radicals may contain one or more electron-withdrawing X substituents such as nitro, halo (especially chloro), alkanoyl (e.g., acetyl), carbalkoxy (e.g., carbomethoxy) and trifluoromethyl. The number of substituents is designated by the subscript n, whose maximum value is the number of aromatic carbon atoms in $Ar^1$ capable of substitution (e.g., 5 for phenyl and 7 for naphthyl). Usually, n will be 0, 1 or 2, and if it is 1 or 2 the substituents will be in the ortho (preferably) or para positions to the boron atom. The n value is preferably 0 or 1, and most desirably 0.

The compounds preferred for use as reagent B are those whose boiling points are not more than about 50° C. lower than the temperature of polymer formation, i.e., not lower than about 230° C., to minimize loss by volatilization. Thus, tri-n-butyl borate (b.p. 235° C.) and triphenyl borate (b.p. above 360° C.) are preferred. It has been discovered, however, that lower boiling borates such as trimethyl and triethyl borate are also active under polymerization conditions, possibly because they are converted to triaryl borates upon contact with diaryl carbonate.

The catalyst preparation method of this invention comprises blending reagents A and B at a temperature within the range of about 0°–150° C., preferably about 25°–100° C. In general, equimolar proportions of reagents A and B are used, but it is within the scope of the invention to use about 0.9–2.0 moles of reagent B per mole of reagent A. The presence of substantially inert diluents in the composition is also contemplated. Typically, such diluents are present as solvents for reagents A and B. Reagent A is most often provided in aqueous solution, and reagent B in a substantially non-polar solvent such as benzene, toluene or the like.

Boron- and nitrogen-containing catalyst precursor compositions prepared by the above-described method are another embodiment of the present invention. The exact nature of these catalyst precursor compositions is not known with certainty. They may be simple physical mixtures of reagents A and B, they may be salts of the type represented by the formula $(R^1)_4N^+B^-(OR^2)_3OH$, or they may comprise all of these species and/or others.

For the preparation of the active catalyst species, the mixture prepared according to the above-described catalyst preparation method additionally comprises (C) at least one compound selected from the group consisting of (C-1) hydroxyaromatic compounds having the formula $$X_n\text{—}Ar^1OH, \quad (III)$$

wherein $Ar^1$, X and n are as previously defined, and (C-2) carbonates of said hydroxyaromatic compounds having the formula $$(X_n\text{—}Ar^1)_2CO_3. \quad (IV)$$

An optional additional ingredient of compound C, present when the desired polymer is a polyester-polycarbonate, is (C-3) at least one diester of said hydroxyaromatic compound having the formula $$Ar^2(\overset{O}{\underset{\|}{C}}\text{—}OAr^1\text{—}X_n)_2, \quad (V)$$

wherein $Ar^2$ is an aromatic hydrocarbon or substituted hydrocarbon radical containing about 6-10 carbon atoms. The substituents on $Ar^2$ may be any typical aromatic substituents, but usually no more than one such substituent is present; unsubstituted radicals, especially phenyl, are preferred. The carboxy groups in reagent C-3 are ordinarily meta or para to each other. Thus, the preferred diesters are diphenyl isophthalate and terephthalate.

The active catalyst species for polymer formation is believed to correspond stoichiometrically to the formula $$(R^1)_4N^+B^-(OR^2)_4.$$

Therefore, the proportion of reagent C should be adjusted to provide one equivalent of the $R^2$ (i.e., $Ar^1\text{—}X_n$) value. This means that one equivalent of said value must be provided by reagent C. Said reagent is in fact, however, most often present in considerable excess for reasons discussed hereinafter.

As will be apparent from the foregoing, the principal utility of the boron-and nitrogen-containing compositions of this invention is for the production of catalysts for polycarbonate or polyester-polycarbonate formation by transesterification. Accordingly, another embodiment of this invention is an improvement in a method for preparing a condensation polymer which comprises catalytically reacting at least one diaryl carbonate with at least one dihydroxyaromatic compound, said improvement comprising preparing the catalyst species by incorporating in the reaction mixture a minor amount of said boron- and nitrogen-containing composition.

The diaryl carbonates useful in the polymer preparation method of this invention are generally those having formula IV hereinabove. A number of such diaryl carbonates are known in the art and are disclosed in the aforementioned U.S. Pat. Nos. 4,330,664 and 4,345,062, as well as the following U.S. patents, the disclosures of which are incorporated by reference herein:

U.S. Pat. No. 4,316,981 U.S. Pat. No. 4,323,668
U.S. Pat. No. 4,321,356 U.S. Pat. No. 4,329,443.

A particularly preferred diaryl carbonate is diphenyl carbonate.

Suitable dihydroxyaromatic compounds are also disclosed in the afornmentioned patents. Particularly useful are 2,2-bis(4-hydroxyphenyl)propane, also known as "bisphenol A", which is preferred, and 1,1-dichloro-2,2-bis(4-hydroxyphenyl)ethylene.

It is also within the scope of the invention to include in the polymerization reaction mixture at least one diester of formula V, as disclosed in the aforementioned U.S. Pat. No. 4,329,443. The condensation polymer formed is then a polyester-polycarbonate.

The relative proportions of polymer-forming reagents in the reaction mixture are generally such as to provide approximately equimolar amounts of dihydroxyaromatic compound, on the one hand, and combined diaryl carbonate and diaryl ester (when used), on the other. Depending on the properties desired in the polymer, either type of reagent may be used in excess up to about 10 mole percent. It is also contemplated to add an end-capping agent, typically a mixed phenyl and o-substituted phenyl carbonate wherein the substituent is an electron-withdrawing group such as chloro, nitro or carbomethoxy, which may be considered a portion of the diaryl carbonate constituent for calculation of mole ratio. When the mixture includes a diaryl ester, the mole ratio of said ester to diaryl carbonate may generally be between about 95:5 and about 5:95 and is most often between about 95:5 and about 50:50.

The amount of boron- and nitrogen-containing composition required to produce the active catalyst species in the polymerization is small, generally only about 0.005-0.1 mole percent. A typical molar ratio of diaryl carbonate, or diaryl carbonate-diester combination, to reagent B is from about 10:1 to about 500:1, preferably about 10-100:1.

The preformed boron- and nitrogen-containing composition may be introduced directly into the polymerization reaction mixture, whereupon the active catalyst species is formed. However, addition of reagent B followed by reagent A is frequently preferred. It is also within the scope of the invention to prepare reagent B in situ by adding boric acid to the reaction mixture or the diaryl carbonate constituent thereof, whereupon said boric acid reacts with the carbonate to form triaryl borate which in turn reacts with reagent A to form the active catalyst species. In that event, boric acid addition should precede addition of reagent A in order to avoid formation of quaternary ammonium borate.

It is usually preferred to carry out the polymerization in two stages. The first stage is effected at temperatures from about 125° to about 275° C., optionally in an inert (e.g., nitrogen or helium) atmosphere and/or under reduced pressure, and results in the formation of a relatively low molecular weight prepolymer. The second stage is typically effected at considerably higher temperatures, usually about 280° C., and optionally under increased or reduced pressure, and converts the prepolymer to the desired high molecular weight polymer.

The invention is illustrated by the following examples. All molecular weights are weight average and were determined by gel permeation chromatography. Intrinsic viscosities (in dl./g.) were determined in chloroform at 25° C.

EXAMPLES 1-5

A mixture of 1.066 moles of diphenyl carbonate, 1 mole of bisphenol A and 0.01 mole of reagent B (added as an 0.01 M solution in toluene) was heated to 180° C. under nitrogen over ½ hour and an appropriate amount of tetramethylammonium hydroxide (reagent A) was added as a 0.01 M aqueous solution. Heating at 180° C. under nitrogen was continued for ½ hour, after which the mixture was heated to 240° C. over 1½ hours as the pressure was decreased, first to 140 torr and then to 10 torr. The low molecular weight polymer thus obtained was allowed to solidify, broken up and heated at 0.3 torr for one hour at 275°–285° C., with stirring. The molecular weight of the resulting polycarbonate (the desired product) was determined. The polycarbonate was then heat-aged at 250° C. in air for 16 hours and the molecular weight again determined.

The results of Examples 1–5 are given in Table I. The control was a polymer prepared by adding tetramethylammonium borohydride (0.01 mole) at the beginning of the polymerization reaction.

TABLE I

| | | | Product | | Heat-aged product | | |
|---|---|---|---|---|---|---|---|
| Example | Reagent B | Reagent A conc., moles | Mol. wt. | Intrinsic viscosity | Mol. wt. | % decrease | Intrinsic viscosity |
| Control | — | — | 78,520 | 0.742 | 36,040 | 54.1 | 0.325 |
| 1 | $(CH_3O)_3B$ | 0.01 | 70,650 | 0.715 | 43,900 | 37.9 | — |
| 2 | $(C_2H_5O)_3B$ | 0.01 | 141,200 | 0.99 | 59,000 | 58.2 | — |
| 3 | $(n\text{-}C_4H_9O)_3B$ | 0.1 | 80,460 | 0.710 | 56,600 | 29.7 | 0.480 |
| 4 | $(n\text{-}C_4H_9O)_3B$ | 0.02 | 63,910 | 0.723 | 46,310 | 27.5 | 0.479 |
| 5 | $(C_6H_5O)_3B$ | 0.01 | 66,800 | 0.679 | 55,420 | 17.0 | — |

As will be apparent from Table I, the use of the boron- and nitrogen-containing compositions for catalyst preparation resulted in polymers having molecular weights and resistance to heat degradation comparable or superior to those of polymers prepared using tetramethylammonium borohydride.

EXAMPLE 6

The procedure of Examples 1–5 was repeated, except that the toluene solution of the borate ester was replaced by an aqueous solution of boric acid on an equimolar basis. A similar polymer was obtained; it had an intrinsic viscosity of 0.526 initially and 0.455 after heat aging.

EXAMPLES 7–9

The procedure of Examples 1–5 was repeated, using triphenyl borate (0.01 mole) as reagent B and 0.01 mole of various quaternary ammonium hydroxides as reagent A. The results are given in Table II. (It is noteworthy that in Example 9, intrinsic viscosity, and therefore molecular weight, continued to increase rather than decreasing during heat-aging.)

TABLE II

| | | Intrinsic viscosity | |
|---|---|---|---|
| Example | Reagent A | Product | Heat-aged product |
| 7 | $(C_2H_5)_4NOH$ | 0.519 | 0.365 |
| 8 | $C_6H_5N(CH_3)_3OH$ | 0.742 | 0.320 |
| 9 | $C_6H_5CH_2N(CH_3)_3OH$ | 0.487 | 0.538 |

EXAMPLE 10

The procedure of Examples 1–5 is repeated, except that one-half the diphenyl carbonate is replaced by an equimolar amount of diphenyl terephthalate. The product is the desired polyester-polycarbonate.

What is claimed is:

1. A method for preparing a boron- and nitrogen-containing composition which comprises preparing, at a temperature within the range of about 0°–150° C., a mixture containing (A) at least one quaternary ammonium hydroxide having the formula $$(R^1)_4NOH, \tag{I}$$

wherein each $R^1$ is independently an alkyl radical containing about 1–4 carbon atoms or an aryl or aralkyl radical containing about 6–10 carbon atoms; and (B) at least one borate having the formula $$(R^2O)_3B, \tag{II}$$

wherein each $R^2$ is independently a lower alkyl radical or a radical of the formula $X_nAr^1$, $Ar^1$ is an aromatic hydrocarbon radical containing about 6–10 carbon atoms, each X is independently an electron-withdrawing substituent and n is a number from 0 to the number of aromatic carbon atoms in $Ar^1$ which are capable of substitution; the molar ratio of reagent B to reagent A being about 0.9–2.0:1.

2. A method according to claim 1 wherein each $R^1$ is alkyl and all $R^1$ radicals are the same.

3. A method according to claim 2 wherein n is 0 or 1.

4. A method according to claim 3 wherein each $R^2$ is $C_{1-4}$ alkyl or phenyl and all $R^2$ radicals are the same.

5. A method according to claim 4 wherein the mixture contains equimolar proportions of reagents A and B.

6. A method according to claim 5 wherein reagent A is tetramethylammonium hydroxide.

7. A method according to claim 6 wherein reagent B is tri-n-butyl borate.

8. A method according to claim 6 wherein reagent B is triphenyl borate.

9. A method according to claim 1 wherein said mixture additionally comprises (C) at least one compound selected from the group consisting of (C-1) hydroxyaromatic compounds having the formula $$X_n\text{—}Ar^1OH \tag{III}$$

wherein $Ar^1$ is an aromatic hydrocarbon radical containing about 6–10 carbon atoms, each X is independently an electron-withdrawing substituent and n is a number from 0 to the number of aromatic carbon atoms in $Ar^1$ which are capable of substitution; and (C-2) carbonates of said hydroxyaromatic compounds having the formula $$(X_n\text{—}Ar^1)_2CO_3; \tag{IV}$$

said compound being present in an amount at least sufficient to provide one equivalent of the $Ar^1$—$X_n$ value.

10. A method according to claim 9 wherein n is 0 or 1.

11. A method according to claim 10 wherein $Ar^1$ is phenyl and n is 0.

12. A boron- and nitrogen-containing composition prepared by the method of claim 1.

13. A boron- and nitrogen-containing composition prepared by the method of claim 3.

14. A boron- and nitrogen-containing composition prepared by the method of claim 6.

15. A boron- and nitrogen-containing composition prepared by the method of claim 7.

16. A boron- and nitrogen-containing composition prepared by the method of claim 8.

17. A method for preparing a polycarbonate by the catalytic reaction of at least one diaryl carbonate with at least one dihydroxyaromatic compound which comprises incorporating in the mixture of said diaryl carbonate and dihydroxyaromatic compound, under polycarbonate-forming conditions, catalytic amounts of:
(A) at least one quaternary ammonium hydroxide having the formula $$(R^1)_4NOH, \qquad (I)$$

wherein each $R^1$ is independently an alkyl radical containing about 1–4 carbon atoms or an aryl or aralkyl radical containing about 6–10 carbon atoms; and
(B) at least one borate having the formula $$(R^2O)_3B, \qquad (II)$$

wherein each $R^2$ is independently a lower alkyl radical or a radical of the formula $X_nAr^1$, $Ar^1$ is an aromatic hydrocarbon radical containing about 6–10 carbon atoms, each X is independently an electron-withdrawing substituent and n is a number from 0 to the number of aromatic carbon atoms in $Ar^1$ which are capable of substitution.

18. A method according to claim 17 wherein the molar ratio of diaryl carbonate to reagent B is from about 10:1 to about 500:1 and the diaryl carbonate has the formula $$(X_nAr^1)_2CO_3. \qquad (IV)$$

19. A method according to claim 18 wherein each $R^1$ is alkyl, all $R^1$ radicals are the same, and the dihydroxyaromatic compound is bisphenol A or 1,1-dichloro-2,2-bis(4-hydroxyphenyl)ethylene.

20. A method according to claim 19 wherein n is 0 or 1, each $R^2$ is $C_{1-4}$ alkyl or phenyl and all $R^2$ radicals are the same.

21. A method according to claim 20 wherein the diaryl carbonate is diphenyl carbonate and the dihydroxyaromatic compound is bisphenol A.

22. A method according to claim 21 wherein the mixture contains equimolar proportions of reagents A and B.

23. A method according to claim 22 wherein reagent A is tetramethylammonium hydroxide and reagent B is tri-n-butyl borate or triphenyl borate.

24. A method according to claim 23 wherein reagent B is prepared in situ by adding boric acid to the reaction mixture or the diaryl carbonate constituent thereof.

25. A method according to claim 24 wherein the mixture contains equimolar proportions of reagents A and B.

26. A method according to claim 25 wherein reagent A is tetramethylammonium hydroxide and reagent B is tri-n-butyl borate or triphenyl borate.

27. A method according to claim 26 wherein the reaction mixture also contains at least one diester having the formula $$Ar^2(\overset{O}{\underset{\|}{C}}-OAr^1-X_n)_2, \qquad (V)$$

wherein $Ar^2$ is an aromatic hydrocarbon or substituted hydrocarbon radical containing about 6–10 carbon atoms.

28. A method according to claim 27 wherein the molar ratio of the diaryl carbonate-diester combination to reagent B is from about 10:1 to about 500:1 and the diester is diphenyl isophthalate or diphenyl terephthalate.

* * * * *